Aug. 21, 1956    J. H. RICKERT    2,759,272
ELECTRICAL INCLINOMETER
Filed Sept. 10, 1951    2 Sheets-Sheet 1

INVENTOR.
JULIUS H. RICKERT
BY
ATTORNEYS

Aug. 21, 1956 J. H. RICKERT 2,759,272
ELECTRICAL INCLINOMETER
Filed Sept. 10, 1951 2 Sheets-Sheet 2

INVENTOR.
JULIUS H. RICKERT
BY
ATTORNEYS

United States Patent Office 2,759,272
Patented Aug. 21, 1956

2,759,272

ELECTRICAL INCLINOMETER

Julius H. Rickert, Philadelphia, Pa.

Application September 10, 1951, Serial No. 245,958

13 Claims. (Cl. 33—215)

(Granted under Title 35, U. S. Code (1952), sec. 266)

The invention described herein may be manufactured and used by or for the Government of the United States of America for governmental purposes without the payment of any royalties thereon or therefor.

The present invention pertains to the art of inclinometers or levels. The invention is embodied in an electrical instrument for determining whether or not a surface is level, or in the case of a surface that is desired to be inclined, the instrument may be used to determine whether or not the surface is inclined correctly as desired.

The inclinometer of the invention comprises a plumb bob which is suspended pendulously in a frame, the frame comprising a surface of rest which describes a plane, and on which the instrument bears when it rests on a surface to be inspected. Companion electrical contact points are arranged spaced apart circumferentially of a circle concentric with the axis of gravity of the plumb bob. Displacement of the plumb bob relative to the frame causes one or another of companion points to close contact, thereby to operate a suitable indicating device in circuit with the companion points. Of the several companion points, those that close contact indicate the direction of inclination of the surface on which the inclinometer rests, and against which the surface of rest of the frame bears. The spacing between companion points, and therefore the magnitude of inclination of the surface that causes contact to close between points, is determined by permissible tolerances according to design specification.

The invention is practically useful for inspecting structures during their construction, to determine the inclination of certain surfaces relative to the desired degree of inclination, and with reference to the horizontal. For example, guns, navigation instruments on ships, and the like equipment, are usually adjusted, set and operated with reference to the horizontal as a datum. Accordingly, it is customary when constructing an emplacement for such an instrument, on a ship for example, to provide a datum surface that is horizontal or level. An instrument embodying the present invention can be used to inspect such a datum surface to determine whether it is accurately level.

The desired inclination of a given surface is customarily indicated in working drawings and specifications, it being the usual situation as hereinbefore noted that the surface should be level or horizontal. Under the most favorable conventional production practices, a surface that is desired to be level usually is not precisely level, but deviates from level to a greater or lesser extent. In different surfaces, the magnitudes of deviation from true level usually vary. Such variations occur in different surfaces of respectively several emplacements for similar equipment on a given ship or the like structure, and in surfaces of different corresponding emplacements of several sister ships of like design and structure. Such a deviation from true level of a given surface is permissible, provided it does not interfere prohibitively with accurate adjustment and operation of the instrument that is to be mounted on the emplacement.

Therefore, in conventional production practice, when it is specified that a given surface shall be level, it is standard procedure to also specify its permissible tolerance, which indicates the permissible deviation of the surface from the specified horizontal. Tolerance limits are specified, which depend upon the required precision for proper operation of the equipment that is to be mounted on the emplacement structure, and accordingly tolerance limits may be low or high in different instances. Preferred production practice is to specify tolerance limits that are as high as is compatible with proper performance of the instrument to be mounted on the emplacement, this being so because precision construction with low tolerances increases production costs.

Therefore, under conventional production practice there is a wide range of variation in specified tolerance limits.

Under prior-art practice of inspecting ship structures, an inclinometer is employed which is adjustable to the inclination of the surface being inspected, whatever that happens to be. A reading of the inclinometer determines the amount of deviation from level of the surface being inspected, thereby determining whether the surface is accurately level within specified tolerance limits. Such prior-art inclinometers are costly, and are easily thrown out of adjustment when they are operated without skill. In addition, prior-art inclinometers require operation by skilled instrument personnel.

The inclinometer of the present invention is pre-set for specified tolerance limits, and is constructed rugged to withstand the hurried operation that is characteristic of inspecting ships and the like structures. Instead of the inclinometer being adjusted precisely to the desired inclination, the accuracy to which the inclinometer is pre-set to the desired inclination is within tolerance limits that are indicated in the design specification for the surface to be inspected. Without further adjustment of the inclinometer, the inspector merely places the inclinometer on the surface being inspected. The inclinometer indicates directly whether or not the surface passes inspection. If the surface fails to pass inspection, i. e., if the surface is inclined beyond permissible tolerances, the inclinometer indicates direction of error, whereby the requisite structural correction is indicated that will make the surface pass inspection.

The principles of the invention, and practical applications thereof, are illustrated in inclinometers shown in the accompanying drawing, to which attention is now directed.

In the drawing

Figure 1:
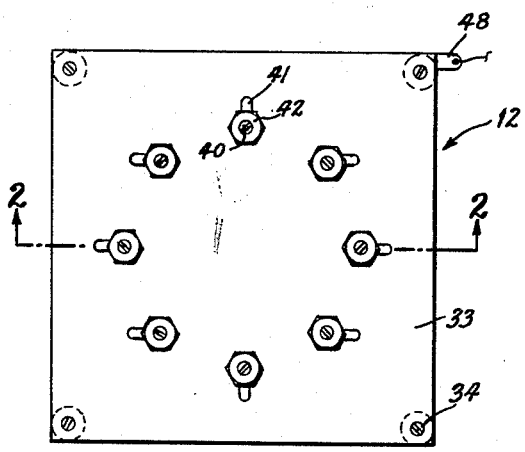
Fig. 1 is a plan view of an inclinometer embodying the invention.
Figure 2:
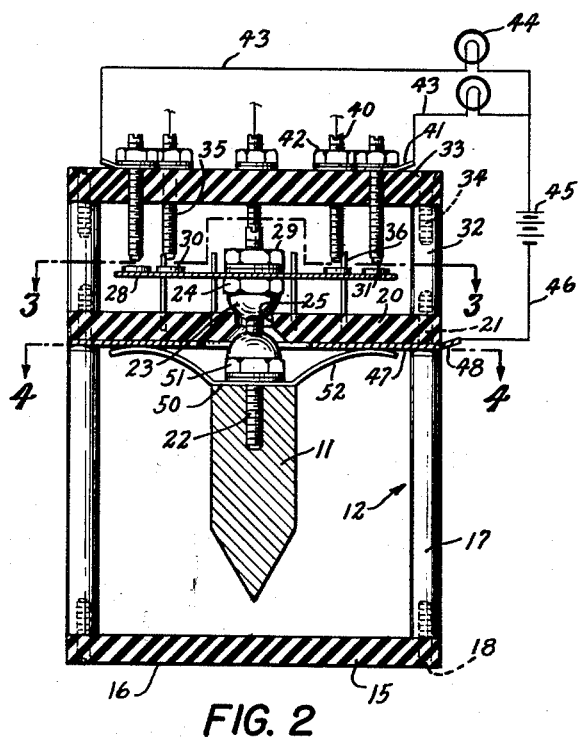
Fig. 2 is a cross-sectional elevation, taken on line 2—2 of Fig. 1.
Figure 5:
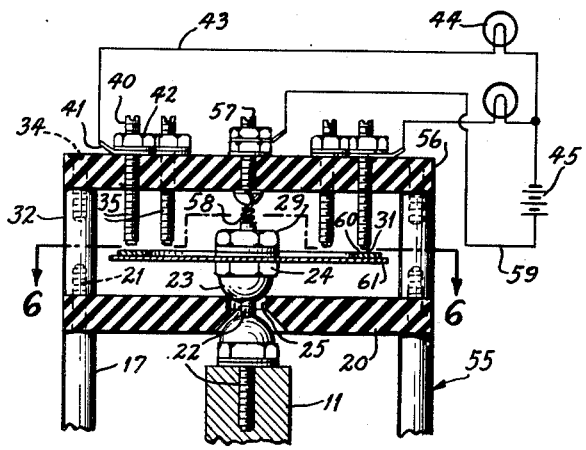
Figure 6:
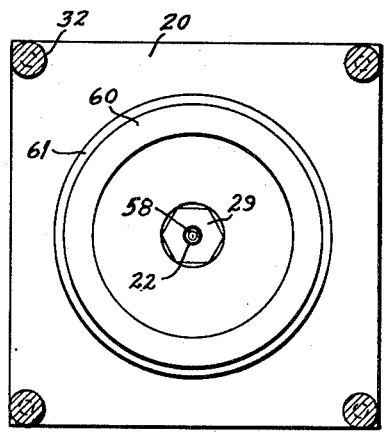
Figure 7:
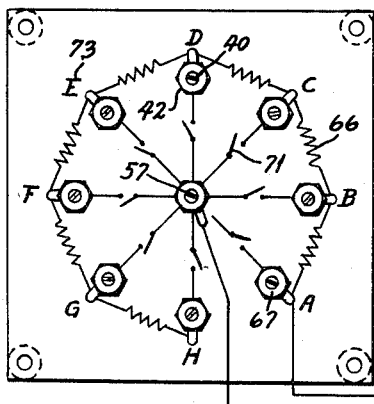
Figure 8:
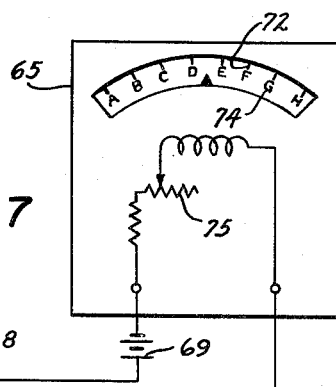
Figure 8:
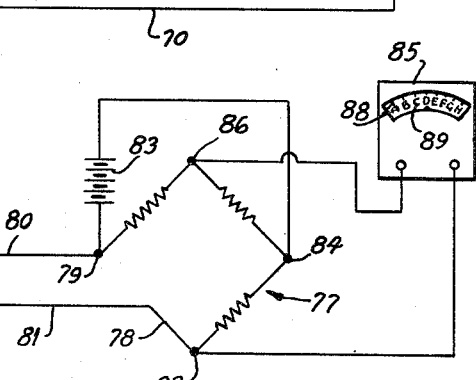

Fig. 5 is a fragmentary cross-sectional elevation, similar to Fig. 2, illustrating a modification of the instrument of Fig. 1, Fig. 6 is a cross-sectional plan, taken on line 6—6 of Fig. 5, Fig. 7 is a plan view similar to Fig. 1, partially schematic, illustrating a modification of the electrical circuits of Fig. 5, and Fig. 8 is a view similar to Fig. 7, illustrating another modified electrical circuit.

The inclinometer of Figs. 1 and 2 comprises a plumb bob 11, and a frame 12, which supports the plumb bob pendulously.

The frame 12 comprises a base panel 15 embodying a surface of rest 16, which describes a geometric plane, and on which the instrument bears when it is rested on a surface to be inspected. The frame 12 includes the upright posts 17 which are secured to the base panel 15 at its corners by screws 18 for example, and which project upwardly therefrom. The corner posts 17 carry the crosspiece or beam 20 which rests on the top of the corner posts, and is secured thereto by means of screws 21 for example.

The plumb bob 11 is an elongated weight, and is contoured symmetrical to position its longitudinal center of gravity coincident with its longitudinal geometric centerline. The screw-threaded shaft 22 projects out of one end of the weight 11 coaxially therewith. Bearing 23 is secured to the shaft 22, and is held located in position of adjustment lengthwise of the shaft by means of the nut 24.

The beam or crosspiece 20 constitutes a panel which is parallel to the surface 16 of base 15, and it comprises a centrally located hole 25 through which the shaft 22 projects, and which constitutes a socket or seat for the bearings 23 to bear upon. The surface of bearing 23 is spherical, having its center located on the centerline of weight 11. With the bearing 23 seated in socket 25, the weight 11 hangs below the panel of crosspiece 20, and swings pendulously from the mount embodying the bearing 23 seated in the hole 25. Resistance against displacement of the weight 11 is uniform and reduced to a minimum by the surface of bearing 23 being spherical.

Figure 3:
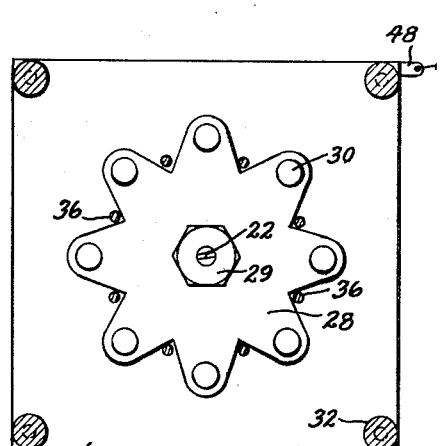
Fig. 3 is a cross-sectional plan, taken on line 3—3 of Fig. 2.

Plate 28, Figs. 2 and 3, is secured concentrically to the shaft 22 of the plumb bob 11 by means of nuts 24 and 29 to extend perpendicularly of the axis of gravity of the plumb bob in all transverse directions. A plurality of contacts or points 30 are secured to the upper face of plate 28 in positions spaced apart at equal intervals circumferentially on a circle of predetermined diameter disposed coaxially with the shaft 22, the exposed face of each of the contacts comprising a contacting surface that constitutes a point. The contact support 28 is held by nuts 24 and 29 to locate the contact surfaces of the several points 30 in a common plane that is perpendicular to the axis of shaft 22, the plane of the several contact points 30 thereby being positioned in a plane that is perpendicular to the center-of-gravity axis of plumb bob 11.

A companion plurality of terminal points 31 is supported by the frame 12, each of the plurality of companion contact and terminal points 30 and 31 respectively constituting a set of companion electrical points.

The upper posts 32 rest on top of the panel 20 at the corners thereof, and are secured thereto by means of screws 21 for example. The panel 33 rests on top of the corner posts 32, and is secured thereto by means of screws 34 for example. Terminals 35 are screw-threaded through the panel 33, and the terminals extend downwardly from the panel 33 towards the lower panel 20, and towards the contact support 28 positioned above the panel 20. Each terminal 35 is positioned in panel 33 to project towards its companion contact 30, and the end surface of each terminal 35 comprises a point 31 which is positioned opposite the contact point 30 of its set, from which it is spaced away a predetermined distance. Thus, companion contact and terminal points 30 and 31 of each set of electrical points are relatively movable into electrical contact with each other by pendulous swing of plumb bob 11, the distance of the swing that closes contact being determined by the spacing between points 30 and 31.

Pins 36 project upwardly from panel 20, each into engagement with a notch of support 28 between contacts 30, as illustrated in Figs. 2 and 3. The pins 36 hold the several contact points 30 each in position of registry with the companion terminal point 31 of its set.

The several terminals 35 constitute an adjustment, and are individually adjustable lengthwise by traverse of their screw threads through panel 33. The sets of points 30, 31 thereby are adjusted or set to a predetermined spacing between points.

For the usual purpose of inspecting a surface that is desired to be level, the several points are adjusted to lie in a plane that is parallel with the surface of rest 16. The adjustment of the points 31 is also made for a uniform spacing of the several sets of points 30, 31, the magnitude of spacing between companion points 30 and 31 of the several sets being predetermined according to the permissible tolerance limits indicated in the design specifications for the surface to be inspected by the inclinometer.

Each terminal 35 projects through and upwardly from panel 33 to constitute a binding post 40, Figs. 1 and 2, to which a connector 41 is attached by means of the nut and washer 42. Each connector 41 is secured by soldering for example to a line or lead 43 of which it forms a termination, and each line 43 includes a suitable indicator 44 in its circuit. The indicators 44 in the embodiment of Fig. 2 are electric lights.

The several terminals 35 and their corresponding lines 43 are connected electrically in parallel with the battery 45 or other suitable source of electrical energy. The battery 45 is connected at 48 through a common return line 46 with the annular contact plate 47. Contact plate 47 is secured in position against the bottom surface of the crosspiece panel 20, by being clamped between the panel and the corner posts 17.

Figure 4:
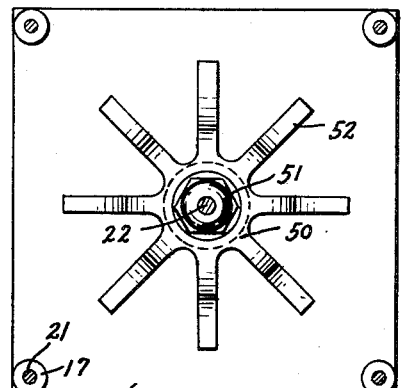
Fig. 4 is a cross-sectional plan, taken on line 4—4 of Fig. 2.

The spring contactor 50, Figs. 2 and 4, is secured to the plumb bob 11 by means of the nut 51 threaded onto the axial shaft 22. The contactor 50 comprises a plurality of leaf springs 52 which radiate from the axis of the plumb bob 11 at equal intervals circumferentially. The several leaf springs 52 bear against the contact plate 47 with equal tensions. Preferably the contactor 50 comprises a leaf spring 52 for each set of points 30, 31, the several springs 52 being positioned in alignment each with its corresponding set of points 30, 31. Movement of any set of points 30, 31 into electrical contact is thus steadied by the opposed tension of its companion spring leaf 52. The contactor 50 thus constitutes a damping device, which inhibits undue arcing between points.

The plumb bob 11 swings on its spherically contoured bearing 23 to always locate its shaft 22 vertical, and the plane common to the several contact points 30 is therefore always horizontal. When the inclinometer of the invention is positioned with its surface of rest 16 bearing on a surface that is horizontal, the plane of the terminal points 31 is also horizontal, and is disposed parallel with the plane of contact points 30. All sets 30, 31 of points are out of electrical contact. When the surface is inclined on which the surface of rest 16 bears, a set of points 30, 31 moves towards electrical contact with each other, and contact becomes closed if the surface of rest 16 is inclined sufficiently. The magnitude of inclination of surface of rest 16 that closes contact is determined by the spacing between points 30, 31, which is established by tolerance limits indicated in design specifications as explained hereinbefore. The inclinometer of the present invention is pre-set to inspect a given surface, or more usually a group of surfaces with like tolerance limits.

Usually only one circuit is closed between a single set of companion points 30, 31, and the corresponding electric light 44 becomes lit, thereby indicating the direction of inclination of the surface being inspected. This indicates the direction of error, and determines the structural correction that is required to make the structure pass inspection.

When the inclinometer of the present invention is rested on a datum surface of an emplacement being inspected for level, the emplacement passes inspection when none of the electrical light indicators 44 lights. When one indicator 44 lights, or may be several adjacent indicators, the emplacement fails to pass inspection because it is not only out of level, but out of level beyond the specified permissible tolerance limits for which the inclinometer is set. The inspection thus indicates that correction is required to bring the emplacement into satisfactory level, and the direction of correction is indicated by that light of the several electric lights 44 that becomes lit.

In addition to the contactor 50 serving to complete the common return circuit of the several terminals 35 connected in parallel, it acts as a damping device which steadies the physical movement of the plumb bob 11. If the surface being inspected is inclined near the limit of permissible tolerance, a set of points 30, 31 may be thrown into and out of contact with each other repeatedly by the pendulous swing of plumb bob 11. Such repeated contacting between points 30, 31 is inhibited by the damping action of springs 52, and excessive arcing between points 30 and 31 is thereby avoided.

A second embodiment of inclinometer of the present invention is illustrated in Figs. 5 and 6.

The supporting frame 55 for the plumb bob 11 of Figs. 5 and 6 is like the frame 12 of Fig. 2, with the exception that the upper panel 56 of Fig. 5, which takes the place of upper panel 33 in Fig. 2, includes the centrally located binding post 57 positioned at the center of terminals 35, thus being disposed coaxially with the bearing 23 of panel 20. Coil spring 58 is electrically connected in any suitable manner at its one end to the end of shaft 22, and to the binding post 57 at its other end. The line or lead 59 connects the binding post 58 with the battery 45, and constitutes the return lead for the parallel circuits of terminals 35 through their respective indicators 44.

The tension of coil spring 58 is sufficient to damp the pendulous swing of plumb bob 11, and thus operates to inhibit undue arcing between points 60, 31 when the inclinometer rests on a surface that is inclined near the limits of its permissible tolerance. The spring contactor 50 of Fig. 2 is therefore not included in the embodiment of Fig. 5.

The points 60 in Fig. 5 are embodied in a flat contact ring that is secured concentrically to the upper face of support plate 61, which is in the form of a disc. The disc 61 of Fig. 5 takes the place of the contact support 28 of Fig. 2, and is secured to shaft 22 in the same manner by means of the nut and washers 29. The exposed face of the ring 60 is supported in a plane that is perpendicular to the axis of shaft 22. The diameter of ring 60 is determined by the circle of terminals 35, and presents points companion to the several terminal points 31, the structure constituting sets of points 60, 31. A contact point of ring 60 is that surface area of its exposed face that happens to be positioned opposite a terminal point 31, to which it is companion. A point of ring 60 is opposite and in companion relationship to each terminal point 31 even if the plumb bob 11 shifts circumferentially on its axis, and the locating pins 36 of Fig. 2 are not needed in the embodiment of Fig. 5, and are not included therefore.

The points 60, 31 are adjusted in the same way that the points 30, 31 of Fig. 2 are adjusted, by traversing the screws of terminals 35 through panel 56. The several points 31 are preferably pre-set to be uniformly spaced away from the contact ring 60, the spacing being predetermined as hereinbefore described to set the inclinometer in accordance with permissible tolerance limits indicated in design specifications.

Operation of the embodiment in Fig. 5 is the same as the embodiment of Figs. 1 and 2 and is deemed clear from the hereinbefore description.

The invention is not limited specifically to visual indicators, and it is not limited specifically to electric lights 44 as disclosed in Figs. 2 and 5, but other indicating means may be employed without departing from practice of the invention. For example, any suitable electrical meter may be employed. In the structure of Fig. 7, an ohmmeter 65, having appropriate electrical characteristics, serves as a visual indicator that takes the place of the electric lights 44 of Figs. 2 and 5. The modification of Fig. 7 is disclosed with the inclinometer of the embodiment of Fig. 5 but the inclinometer of Fig. 2 will serve equally well with slight modification of the wiring that is thought to be clear to persons skilled in the art.

The several binding posts 40 of terminals 35 are connected in series with a fixed resistance 66 between each two of next adjacent or successive terminals. Of the several binding posts 40, the binding post 67 of an end terminal 35 of the series is connected to one side of the ohmmeter 65 through line or lead 68, the battery 69 being included in the line. The other side of the ohmmeter 65 is connected through the return lead 70 to the central binding post or tap 57.

A switch between each of the several binding posts 67 and 40 and the central binding post 57, illustrated schematically at 71, may be closed to complete the circuit through ohmmeter 65. Each of the several switches 71 may constitute one of the set of points 60, 31, or one of the set of points 30, 31 in the modification of Fig. 2. Thus, the several switches 71 may be closed alternatively by the inclinometer resting on a surface that is inclined, the direction of inclination of the surface of rest determining which of the several switches 71 becomes closed as described hereinbefore.

The switch of the several switches 71 that is closed by the inclinometer resting on an inclined surface is indicated along the scale 72 of the ohmmeter 65 according to the number of fixed resistances 66 in the circuit between the end binding post 64 and the binding post 40 of the switch 71 that is closed. The binding posts 40 and 67 of the several terminals 35 in Fig. 7 may be provided with a suitable series of indicia 73, corresponding indicia 74 being inscribed on the scale 72 of the ohmmeter 65 in accordance with resistance values of the respective several terminals 35. The ohmmeter reading is thus a direct indication of the direction of inclination of the surface being inspected.

The ohmmeter 65 includes a rheostat 75 for zero adjustment of the scale 72.

Another modification of a visual indicator is illustrated in Fig. 8.

The apparatus of Fig. 8 comprises a Wheatstone bridge 77, the inclinometer of the invention being included in one leg 78 of the Wheatstone bridge 77. The binding posts 40 of terminals 35 are connected in series with a fixed resistance 66 between each two of next adjacent or successive binding posts of the series. An end binding post 67 of the series of binding posts 40 is connected to one terminal 79 of the inclinometer leg 78 of Wheatstone bridge 77 through the line or lead 80. The central binding post or tap 57 of the inclinometer is connected through return lead 81 to the other end terminal 82 of the inclinometer leg 78. A switch, indicated schematically at 71, connects each binding post 40 and 67 with the central binding post 57 in the same manner and for the similar purpose as in Fig. 7.

A battery 83, or other suitable power source, is connected across opposite terminals 79 and 84 of Wheatstone bridge 77 in the usual manner, and the galvanometer 85 is connected across the other opposite terminals 82 and 86. The scale 88 of the galvanometer 85 is provided with a set of indicia 89 which are located along the scale 88 to correspond with the companion set of indicia 73 of the several binding posts 40 and 67. The resistance 90 is variable for zero adjustment of the scale 88.

The invention is not limited to the specific structures disclosed in the drawings and specification, but is determined by the accompanying claims to which attention is now directed.

I claim:

1. In a portable instrument for determining the inclination of a surface, a plumb bob, a frame supporting the plub bob pendulously and comprising a bottom surface that describes a geometric plane and constitutes a surface of rest for the instrument to bear against a surface to be inspected, companion electrical contact points carried by the plumb bob and the frame respectively, the several companion points being arranged spaced apart circumferentially of a circle concentric with the vertical axis of gravity of the plumb bob and constituting a circle of points for each of the plumb bob and the frame, the contact points of the plub bob comprising their contact surfaces in a common plane perpendicular to the vertical axis of gravity of the plumb bob, each contact point of the frame comprising a contact surface positioned face-to-face with reference to its companion contact point of the plumb bob, an adjustment for the contact points of the frame to move the frame points in directions lengthwise of the vertical axis of gravity of the plumb bob and to adjust the space between each frame point and its companion plumb-bob point, an electrical indicator operable by companion contact points of the several circles of points closing contact with each other to indicate those contact points in contacting engagement responsive to pendulous displacement of the plumb bob with reference to the frame according to the inclination of the plane of the surface of rest.

2. In apparatus as defined in claim 1, resilient means damping the pendulous swing of the plumb bob with reference to the frame.

3. In aparatus as defined in claim 1, the adjustment for the points of the frame constituting an individual adjustment for each of the frame points towards and away from its companion point of the plumb bob.

4. In apparatus as defined in claim 1, the frame comprising a panel disposed parallel with the plane of the surface of rest, a terminal for each contact point of the frame constituting a screw threaded through the panel and projecting towards the plane of contact surfaces of the plumb-bob points, the end surface of each terminal that is proximate to the plumb-bob points constituting the contact surface of the corresponding point of the terminal, the adjustment of the frame points constituting the screw traverse of the several terminals through the panel.

5. In apparatus as defined in claim 4, a support for the contact points of the plumb bob comprising a plate secured to the plumb bob and extending transversely of the axis of gravity thereof perpendicularly in all transverse directions, the points of the plumb bob being secured to the face of the plate that is nearest the points of the frame with their exposed surfaces constituting each the contact surface of its corresponding point.

6. In apparatus as defined in claim 5, a pin secured to the frame and projecting into engagement with the support plate to hold the several points of the plumb bob each in registry with its companion point of the frame.

7. In apparatus as defined in claim 4, a support for the contact points of the plumb bob comprising a disc secured to the plumb bob concentric with the axis of gravity thereof and extending perpendicularly in all transverse directions, a flat ring secured concentrically to the face of the disc that is nearest the points of the frame, the exposed face of the ring constituting the several contact surfaces of the points of the plumb bob.

8. In apparatus as defined in claim 1, the frame comprising a beam parallel with the plane of the surface of rest, a mount for the plumb bob comprising a spherical bearing secured to the plumb bob with its center on the axis of gravity therefor, the beam comprising a seat for the spherical bearing.

9. In apparatus as defined in claim 8, the plumb bob comprising a spring plate secured thereto and extending transversely away from the axis of gravity of the plumb bob, the spring plate comprising a plurality of radially disposed leaf springs spaced apart circumferentially, each of the several leaf springs bearing against the panel embodying the plumb-bob mount in the direction of seating the bearing.

10. In apparatus as defined in claim 7, a spring damping pendulous swing of the plumb bob.

11. In apparatus as defined in claim 1, an electrical circuit comprising a source of electrical energy, an indicator for each of companion contact points, the several contact points of a circle of points and their respective indicators being connected in parallel with the energy source.

12. In apparatus as defined in claim 1, an electrical circuit comprising a source of electrical energy and a resistance-responsive electrical meter, the several contact points of a circle of points being connected in series, a fixed resistance connecting each two of next adjacent points of the series-connected circle of points, the several companion contact points being connected through the meter and the energy source.

13. In apparatus as defined in claim 12, a Wheatstone bridge in the electrical circuit the several companion contact points being connected in one leg of the Wheatstone bridge.

References Cited in the file of this patent

UNITED STATES PATENTS

| | | |
|---|---|---|
| 602,709 | Vetter | Apr. 19, 1898 |
| 774,815 | Anderson | Nov. 15, 1904 |
| 1,625,149 | Petnal | Apr. 9, 1927 |
| 1,736,746 | McShane | Nov. 19, 1929 |
| 1,830,298 | Tartaglia | Nov. 3, 1931 |
| 1,850,399 | Jakosky | Mar. 22, 1932 |
| 1,908,430 | Lapsley | May 9, 1933 |
| 1,963,090 | Jakosky | June 19, 1934 |
| 2,171,156 | Lawton | Aug. 29, 1939 |
| 2,311,855 | Nelson | Feb. 23, 1943 |

FOREIGN PATENTS

| | | |
|---|---|---|
| 386,817 | France | Feb. 1, 1908 |
| 259,479 | Germany | Mar. 18, 1911 |
| 122,948 | Great Britain | Mar. 6, 1918 |
| 626,149 | Great Britain | July 11, 1949 |